April 2, 1946.   I. R. VERSOY ET AL   2,397,710
ACCELERATION BELT AND STOCKINGS FOR AVIATORS
Filed Sept. 13, 1941   3 Sheets-Sheet 1
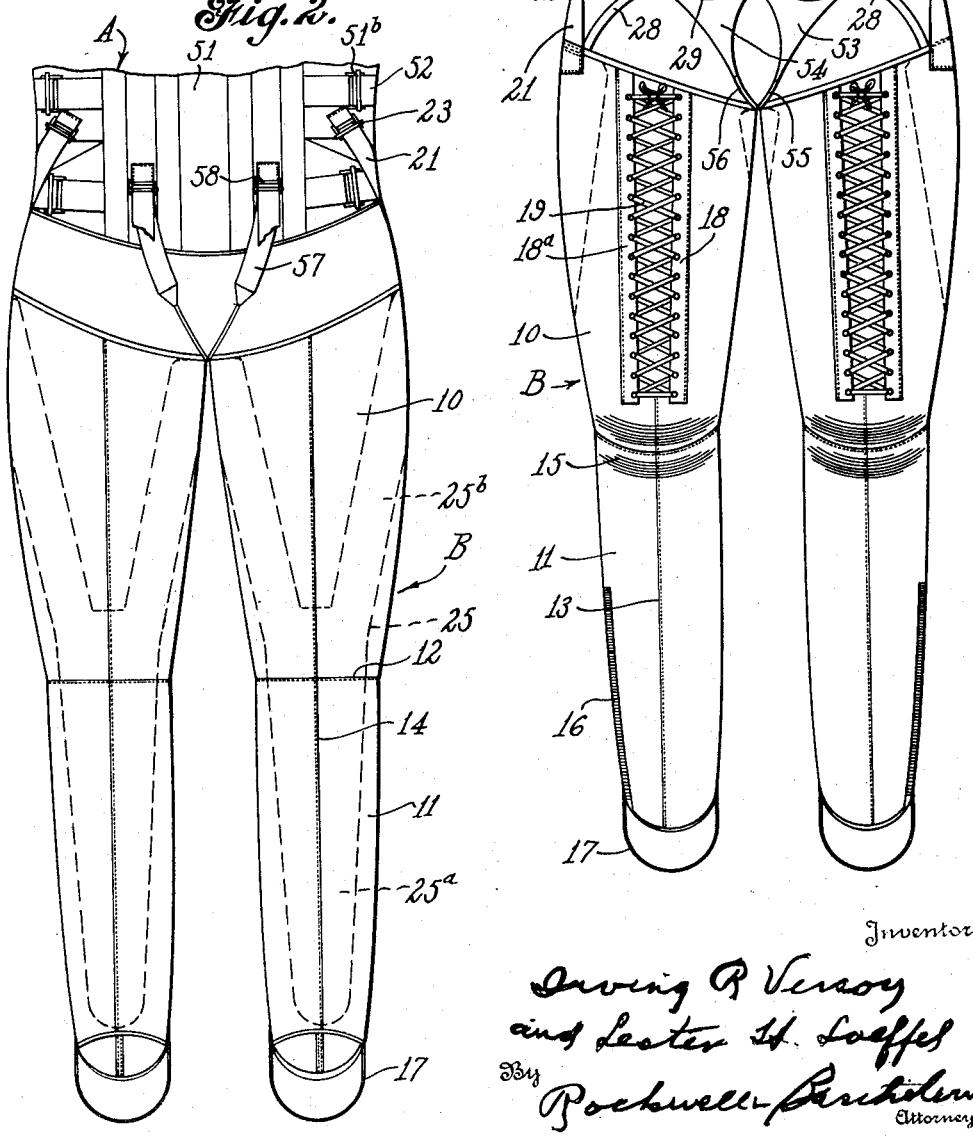

April 2, 1946.  I. R. VERSOY ET AL  2,397,710
ACCELERATION BELT AND STOCKINGS FOR AVIATORS
Filed Sept. 13, 1941  3 Sheets-Sheet 2
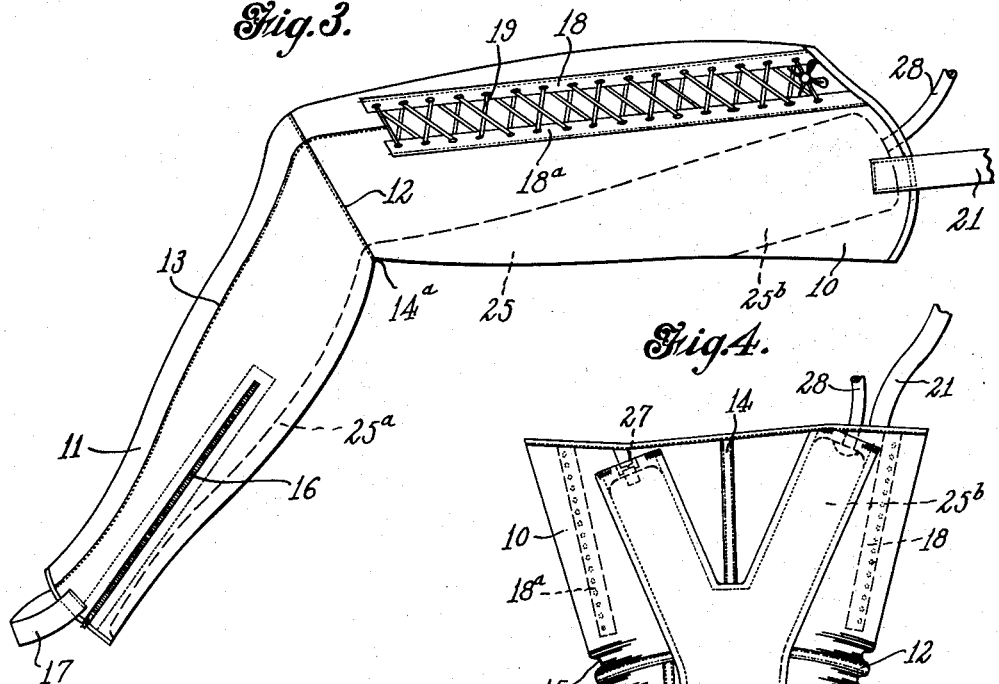
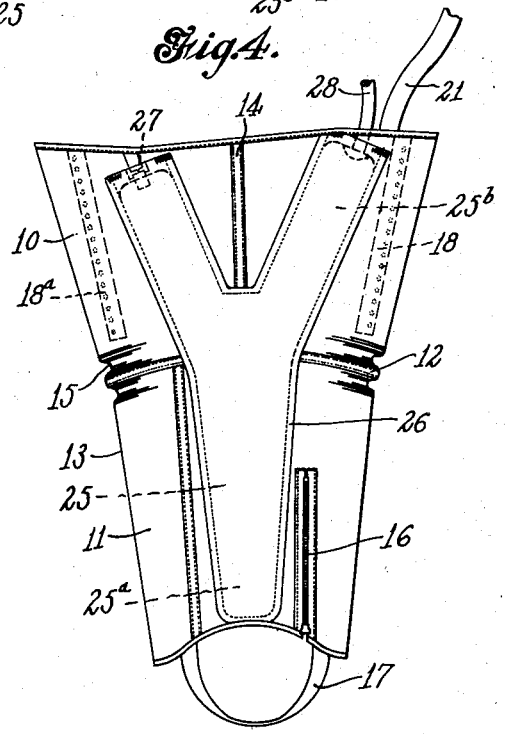
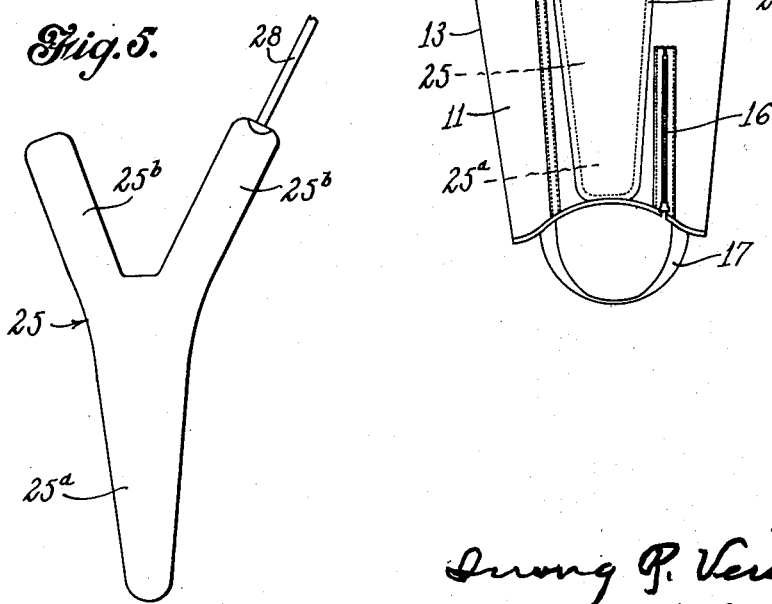
Inventor
Irving R. Versoy
and Lester H. Loeffel
By Rockwell & Bartholow
Attorneys

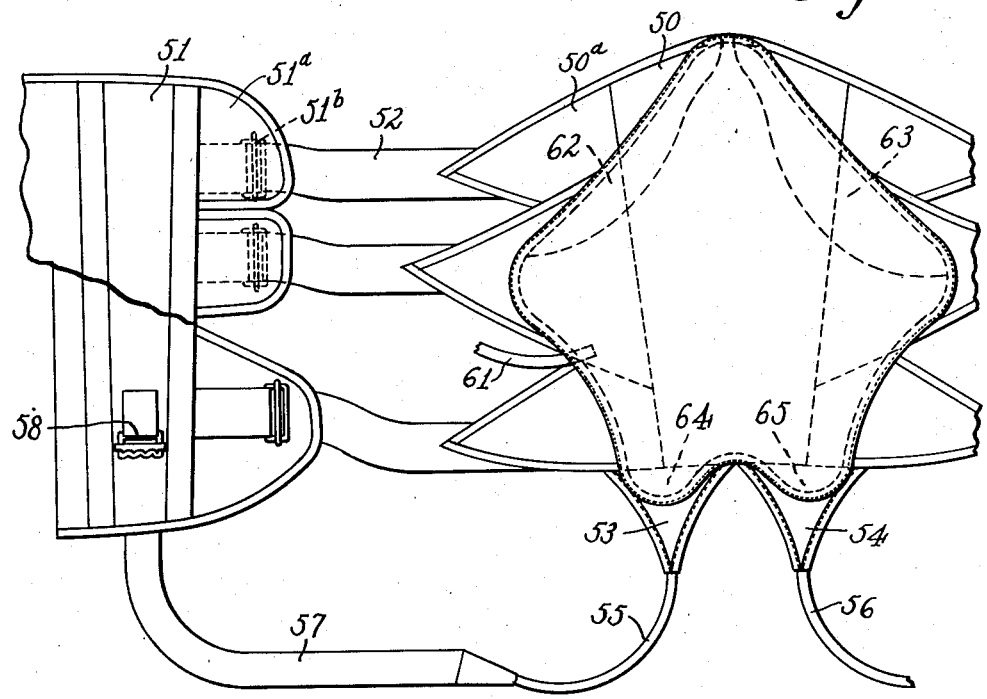
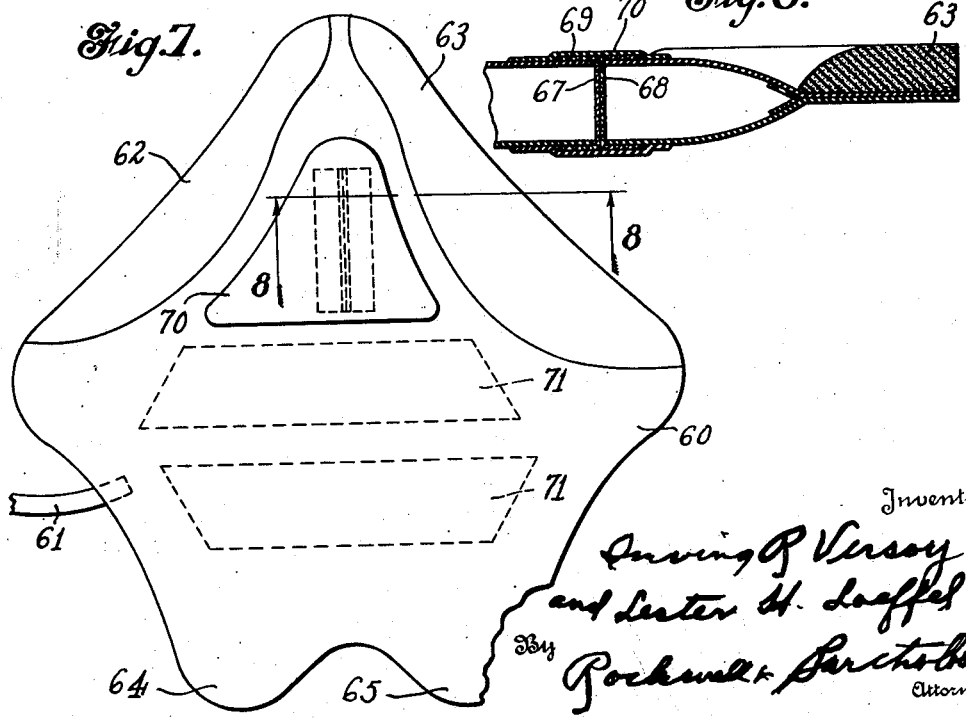

Patented Apr. 2, 1946

2,397,710

UNITED STATES PATENT OFFICE 2,397,710

ACCELERATION BELT AND STOCKING FOR AVIATORS

Irving R. Versoy, New Haven, and Lester H. Loeffel, West Haven, Conn., assignors, by mesne assignments, to The Berger Brothers Company, New Haven, Conn., a corporation of Connecticut Application September 13, 1941, Serial No. 410,672

11 Claims. (Cl. 128—1)

This invention relates to protective garments designed for aviators, but is not necessarily confined to such use as the constructional features may be advantageously employed in garments suitable for other uses.

In the operation of an airplane, and particularly in dive bombing, for example, in which maneuver the aviator plunges almost vertically downward at a high rate of speed and then rights his plane at the bottom of the dive, or even turns it upwardly to start another climb, the centrifugal force caused by high speed with sudden changes in direction affects the balance of the bodily functions, due to inability of the vascular system to maintain a proper distribution of blood to the various organs. In addition, the organs of the body are displaced to an excessive extent, together with their large supply of blood, producing ill effects of various kinds. Moreover, it has been found that an abnormal portion of the blood supply during such maneuvers will have a tendency to be forced into the legs of an aviator, thus resulting in a deficiency of blood supply and reduced arterial pressure in the heart region and head.

One object of the present invention is the provision of an improved belt or protective garment for aviators which will serve to support and confine various portions of the body of the aviator to prevent the ill effects attendant upon airplane operation.

Another object of the invention is the provision of a stocking or legging which may be worn upon the legs of the aviator and which will exert pressure externally upon the fleshy portions of the legs to prevent the forcing of an abnormal portion of the blood supply into this region of the body.

Another object of the invention is the provision of a stocking or legging for aviators designed to exert pressure upon the legs by means of a pneumatic cushion or bladder, which may be inflated to the proper extent to effect the desired pressure.

A still further object of the invention is the provision of a stocking or legging of the character described, which is designed to be adjusted to the leg portion of the body of the aviator so as to interfere to the least possible extent with freedom of movement, while at the same time the bladder portion thereof may be inflated to exert the proper pressure over a large portion of the length of the leg to prevent an abnormal portion of the blood supply being forced into this part of the body.

To these and other ends the invention consists in the novel features and combinations of parts to be hereinafter described and claimed.

In the accompanying drawings:

Fig. 1 is a front elevational view of a combined acceleration belt and stockings embodying our invention;

Fig. 2 is a rear view of the stockings and lower portion of the belt;

Fig. 3 is a view of the stocking alone, shown in the position usually assumed by the leg of the aviator when seated in an airplane;

Fig. 4 is an interior view of the stocking, the latter being opened up along the front longitudinal seam;

Fig. 5 is a detail view of the bladder of the stocking;

Fig. 6 is an inside or rear view of the belt, the garment being folded over at one corner for purposes of illustration;

Fig. 7 is an enlarged front elevational view of the cushioning means at the inside of the front section of the belt; and Fig. 8 is a sectional view on line 8—8 of Fig. 7.

To illustrate a preferred embodiment of our invention, we have shown in Fig. 1 of the drawings an aviator's belt designated generally by the letter A, and stockings or leggings designated generally at B. The belt A, which will be described more particularly hereinafter, is generally similar to that shown in our prior application for United States Letters Patent, Serial No. 363,892, filed November 1, 1940, but is modified in some respects, as will be apparent as the description proceeds.

The stockings B are of identical form except that they are "rights" and "lefts," and a description of one thereof will suffice for both. This stocking comprises an upper leg portion 10 and a lower leg portion 11, the two portions being joined along the seam 12. As formed, each portion is provided with a front longitudinal seam 13 and a rear longitudinal seam 14. The two portions of the stocking are shaped generally to conform to the shape of the legs, as will be noted from Fig. 3, and the sections are joined together in such a way that both front and rear portions will lie flat or be extended when the leg is bent, as shown in this figure, which is approximately the normal position of the leg when the aviator is seated in the plane. It will also be noted that when the wearer is in standing position the rear portion of the garment will hinge about the lower side of the seam 12, or at about the point designated at 14ª in Fig. 3, so that the stocking at the back seam of the leg will be smooth in standing position, and also at the same time will not interfere with the straightening or flexing of the leg. As the straightening of the knee renders the front or top portion thereof somewhat shorter, the material will crease or fold, as shown at 15 in Fig. 1, when the wearer is in standing position.

The lower portion of the leg may be provided with an elongated opening 16, controlled by a hookless fastener or "zipper," so that the lower or smaller portion of the garment may be opened to enable it to be slipped on over the foot. A tape 17 is provided to engage below the arch of the foot of the wearer and hold the garment in proper position.

The upper portion of the leg is provided with laces so that it may be adjusted to a considerable extent to fit the individual person. This may be readily arranged by securing to the outer surface of the material of which the garment is made a pair of eyelet strips 18 and 18ª, these strips having openings through which the lacer 19 is passed. While the upper part of the stocking is form-fitting to an extent, as well as the lower portion, this lacing enables considerable individual adjustment to be made so that it will not be necessary to manufacture the garment in a large number of sizes.

At the upper edge of the upper portion of the stocking is secured the supporting strap 21, which, as shown in Fig. 2, is secured to a buckle 23 carried by the rear portion of the belt A. These straps give the stockings vertical support, and in conjunction with the lower straps 17 which engage under the arch of the foot, maintain the garment in proper position upon the leg, extending from the ankle to the groin or thigh.

Within the stocking just described is placed an inflatable bladder which is designed to effect pressure upon the fleshy portions of the leg. The position of the bladder is shown particularly in Fig. 4, in which the stocking is shown as opened up at the center front seam. As shown, the bladder 25 is Y-shaped in form, provided with a lower portion 25ª extending from the lower edge of the stocking, or approximately the ankle of the wearer, to a point above the knee, and upper branched portions 25ᵇ extending to a point adjacent the upper edge of the garment. It will be noted particularly from Fig. 4 that the bladder is positioned at the back of the leg below the knee so as to lie against the calf of the leg and exert pressure on the fleshy portion of this part of the body, while above the knee the bladder is divided into the two branches, which extend spirally over the inner and outer sides of the legs.

The bladder is held in position by being confined in a pocket between the material of the garment itself and a piece of fabric 26 stitched to the inner side of the garment, which piece of material is substantially the same shape as the bladder, and which with the stocking forms a pocket in which the bladder fits. The material of the stocking will preferably be a non-elastic fabric of duck or similar material, which will be sufficiently strong and at the same time of sufficiently light weight so that it will not be cumbersome. One of the upper branches of the bladder may be secured in place within the pocket by a buckle or similar fastening 27, while the other branch may conveniently be provided with an inflation tube 28, which projects outwardly through an opening in the pocket, to be joined to a Y 29, shown in Fig. 1.

In Figs. 6 to 8 of the drawings we have shown a belt, preferably of non-elastic fabric material, designed to be worn about the body, which belt is provided with cushioning means at the inner front portion thereof. This belt comprises front and rear panels 50 and 51 to which are secured laterally extending tabs 50ª and 51ª, respectively, which tabs are connected by straps 52, the straps being secured at one end to the tabs 50ª and having their free ends adjustably connected with the tabs 51ª by buckles 51ᵇ. To the front section of the belt are secured depending tabs 53 and 54, to which are connected perineal straps 55 and 56. These straps are designed to pass between the legs of the wearer and are provided with end portions 57 designed to be secured to buckles 58 (one only being shown) secured upon the outer face of the back section 51. These straps serve to hold the garment in place upon the wearer.

Cushioning means are secured to the inner face of the front section 50 of the belt, as shown in Figs. 6 and 7, and comprise a lower bladder section 60 capable of being inflated through the tube 61, and an upper section comprising right- and left-hand lobes 62 and 63. These lobes are preferably of a soft, compressible material such as foam rubber, for example, and it will be understood that the bladder portion 60 extends upwardly between these lobes over the sternum. When the bladder is inflated it will be distended to a plane beyond that of the lobes 62 and 63 so that a shelf-like area will be formed between the two sections of the cushioning means, as shown in Fig. 8.

It will be noted that the lower portion of the bladder section is provided with depending lobes 64 and 65, which lobes will be pressed tightly against the groin section of the wearer by the perineal tabs 53 and 54. The separation of the walls of the upper or neck portion of the bladder between the lobes 62 and 63 may be limited by the construction shown in Figs. 7 and 8. For this purpose the front and back walls of the bladder may be slit, and through these slits may be passed strips of tape 67 and 68 the body portions of which lie flatly against each other within the bladder, and the end portions of which are turned outwardly to overlie the walls of the bladder, as shown at 69. A piece of rubber 70 (it will be noted that the bladder portion 60 will probably be formed of this material) may be cemented or vulcanized over the outwardly turned end 69 of the tapes 67 and 68 to secure these members in position and render the bladder airtight by closing the slits through which they are passed. It will be apparent that these tapes will act as a positive limit to the separation of the walls of this portion of the bladder. The separation of the walls at the lower portion of the bladder may be limited by members 71, which are secured to the front and rear walls of the bladder and are connected together at their ends so as to prevent undue distention of the bladder over this area. These members are similar to the corresponding elements shown in our prior application above referred to.

To the Y 29, previously described, is secured an air tube 72, which leads into one branch of another Y 73 with which also communicates the tube 61 leading to the bladder 60 of the belt. From this Y a tube 74 leads to a three-way valve 75, which has communicating therewith an exhaust or vent tube 76 and a tube 77 leading to a pressure relief valve 78, which valve is connected by a tube 79 to a source of air pressure through an oil vapor separator 80.

It will be understood that the pressure relief valve will be so regulated as to maintain the proper pressure in the bladders of the belt and stockings. It has been found in practice that a pressure of approximately two pounds is desirable to effect the proper result.

When the wearer of the garment desires to inflate the bladders thereof, the valve handle 81 will be thrown to the proper position to connect the tube 14 with the source of air pressure. This will serve to inflate the bladders up to the maximum permitted by the setting of the pressure relief valve 78. This will usually be done just before the undertaking of a manuever such as a dive, for example, which would require the use of the protective features of the garment. After the maneuver has been completed the handle 81 may be thrown to the other position, which will permit the bladders of both stockings and belt to vent to the atmosphere. Preferably the communication between the Y 73 and the tube 61 leading to the bladder of the belt will be restricted to some extent relatively to that of the tube 72, so as to permit the bladders of the stockings to be filled to the desired pressure before the belt bladder is filled, and the stocking bladders will, due to their shape, fill from the bottom up so that they will exert proper pressure upon the legs of the wearer throughout their entire areas.

While we have shown and described a preferred embodiment of our invention, it will be understood that it is not to be limited to all of the details shown, but is capable of variation and modification within the spirit of the invention and within the scope of the appended claims.

What we claim is:

1. An aviator's garment comprising an inelastic member to embrace a limb of the wearer, means disposed at the inner surface of said member to react thereagainst and apply pressure to said limb, said means comprising an inflatable bladder, and said bladder being confined against the limb of the wearer by said member whereby it is caused to expand inwardly upon inflation.

2. An aviator's garment comprising a stocking-like member adapted to enclose the leg above and below the knee, and an inflatable bladder carried at the inner face of said member to exert pressure on the leg of the wearer, said bladder having a single lower portion at the back of the stocking and an upper branched portion above the knee section of the garment.

3. An aviator's garment comprising a stocking-like member adapted to enclose the leg above and below the knee, and an inflatable bladder carried at the inner face of said member to exert pressure on the leg of the wearer, said bladder having a single lower portion at the back of the stocking and an upper branched portion above the knee section of the garment, the branches of said upper portion extending spirally of the leg of the wearer.

4. An aviator's belt or the like comprising front and back sections and means securing said sections together, and cushioning means carried at the inner surface of the front section, said cushioning means comprising a lower inflatable bladder portion and an upper non-inflatable lobed portion, the latter portion being formed of a soft compressible material and said bladder portion extending upwardly between the parts of said lobed portion.

5. An aviator's belt or the like comprising front and back sections and means securing said sections together, and cushioning means carried at the inner surface of the front section, said cushioning means comprising a lower inflatable bladder portion and an upper lobed portion, the latter portion being formed of a soft compressible material, and there being a shelf-like area between said portions when the bladder portion is inflated.

6. A protective device for aviators, comprising a belt adapted to encircle the body and having a front panel section, an inflatable bladder secured to the inner face of said section, a stocking adapted to encircle the leg portion of the wearer and carrying an inflatable bladder at the inner surface thereof, means connecting said stocking to the belt to support the former from the latter, a source of air pressure, and means connecting both said bladders to said source.

7. A protective device for aviators, comprising a belt adapted to encircle the body and having a front panel section, an inflatable bladder secured to the inner face of said section, a stocking adapted to encircle the leg portion of the wearer and carrying an inflatable bladder at the inner surface thereof, means connecting said stocking to the belt to support the former from the latter, inflating tubes connected to both said bladders, a source of air pressure, and valve means for placing said tubes in communication with said source.

8. A protective device for aviators, comprising a belt adapted to encircle the body and having a front panel section, an inflatable bladder secured to the inner face of said section, a stocking adapted to encircle the leg portion of the wearer and carrying an inflatable bladder at the inner surface thereof, means connecting said stocking to the belt to support the former from the latter, inflating tubes connected to both said bladders, a source of fluid pressure, valve means for placing said tubes in communication with said source, and means to limit the degree of inflation of said bladders.

9. An aviator's garment comprising a body portion adapted to encircle the body of the wearer and having a front panel section and an inflatable bladder secured to the inner face of said section to lie against the abdominal section of the wearer, a limb portion to encircle a limb of the wearer and carrying an inflatable bladder at the inner surface thereof, said limb portion being connected to the body portion, and an air conduit common to both bladders for placing them in communication with a source of air under pressure.

10. An aviator's garment having a section for encircling the body of the wearer and sections for surrounding the limbs of the wearer, said last-named sections being connected to the first section, each of said sections being adjustable in girth to the body of the wearer, an inflatable bladder secured to the inner surface of each of said sections, and means for connecting said bladders to a single source of compressed air for inflating the same.

11. An aviator's garment comprising a stocking-like member of inelastic material adapted to enclose the leg of the wearer above and below the knee, an inflatable bladder supported upon the inner face of a portion of the wall of said member and adapted to expand inwardly upon inflation thereof and compress the leg between the inner face of the bladder and the opposite wall of said member, and means for connecting said bladder to a source of air under pressure.

IRVING R. VERSOY.
LESTER H. LOEFFEL.